(12) United States Patent
Yun et al.

(10) Patent No.: US 12,116,023 B1
(45) Date of Patent: Oct. 15, 2024

(54) DROPLET-BLOCKING AIR CONDITIONING SYSTEM INSIDE TRAIN COMPARTMENT

(71) Applicant: KOREA RAILROAD RESEARCH INSTITUTE, Uiwang-si (KR)

(72) Inventors: Sung-Ho Yun, Seoul (KR); Yong-Jun Jang, Anyang-si (KR); Jae-Chul Kim, Anyang-si (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 0 days.

(21) Appl. No.: 18/683,008

(22) PCT Filed: Apr. 8, 2022

(86) PCT No.: PCT/KR2022/005113
§ 371 (c)(1),
(2) Date: Feb. 12, 2024

(87) PCT Pub. No.: WO2023/022322
PCT Pub. Date: Feb. 23, 2023

(30) Foreign Application Priority Data

Aug. 17, 2021 (KR) .................. 10-2021-0108159

(51) Int. Cl.
*B61D 27/00* (2006.01)
*B60H 1/34* (2006.01)
*B60H 3/06* (2006.01)
(52) U.S. Cl.
CPC ......... *B61D 27/0018* (2013.01); *B60H 1/345* (2013.01); *B60H 3/0608* (2013.01)

(58) Field of Classification Search
CPC ... B61D 27/0018; B60H 1/345; B60H 3/0608
(Continued)

(56) References Cited

U.S. PATENT DOCUMENTS 2,256,350 A * 9/1941 Nystrom ............ B61D 27/0081
454/75
3,862,549 A * 1/1975 Fernandes .......... B61D 27/0018
165/42

(Continued)

FOREIGN PATENT DOCUMENTS

| CN | 111661086 A | 9/2020 |
| JP | H09-104345 A | 4/1997 |

(Continued)

*Primary Examiner* — Avinash A Savani
*Assistant Examiner* — Dana K Tighe
(74) *Attorney, Agent, or Firm* — Bridgeway IP Law Group, PLLC; Jihun Kim

(57) ABSTRACT

A droplet-blocking air conditioning system inside a train compartment according to an exemplary embodiment may include an air conditioning system unit for regulating the temperature and humidity of the air inside the train compartment; an air supply regulation unit which uses downdraft air to supply the compartment with the air that has had the temperature and humidity regulated by the air conditioning system unit, thereby causing the droplets remaining in the compartment to flow below the compartment due to the downdraft air; mechanical and electronic motors which control a degree of rotation of the air adjustment member according to the degree of rotation of a rotary shaft inside the air supply regulation unit; and an air discharge unit for discharging the droplets and the downdraft air to the outside of the compartment.

6 Claims, 6 Drawing Sheets

(58) Field of Classification Search
USPC .......................................................... 454/99
See application file for complete search history.

(56) References Cited

U.S. PATENT DOCUMENTS

| | | | | |
|---|---|---|---|---|
| 5,389,035 | A * | 2/1995 | Ishida | B61D 27/0018 |
| | | | | 454/115 |
| 10,864,925 | B2 * | 12/2020 | Preiss | B61C 17/04 |
| 2019/0077215 | A1 * | 3/2019 | Baek | B60H 1/246 |
| 2019/0111949 | A1 | 4/2019 | Ochiai | |
| 2020/0254847 | A1 | 8/2020 | Nakamura et al. | |
| 2021/0070133 | A1 * | 3/2021 | Laux | B60H 1/00564 |

FOREIGN PATENT DOCUMENTS

| | | |
|---|---|---|
| JP | H10-318582 A | 12/1998 |
| JP | 2011-030719 A | 2/2011 |
| JP | 2014-151681 A | 8/2014 |
| JP | 6228087 B2 | 11/2017 |
| KR | 10-1992650 B1 | 6/2019 |
| KR | 10-2020-0001232 A | 1/2020 |
| KR | 10-2230159 B1 | 3/2021 |

* cited by examiner

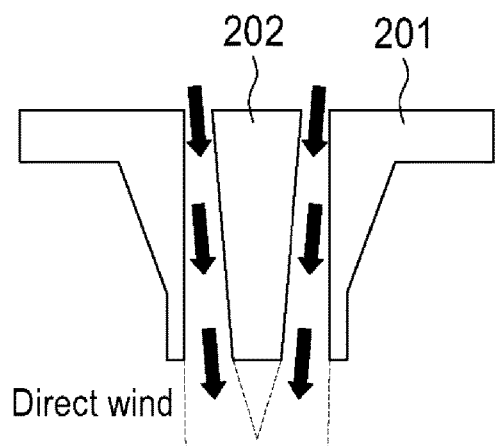
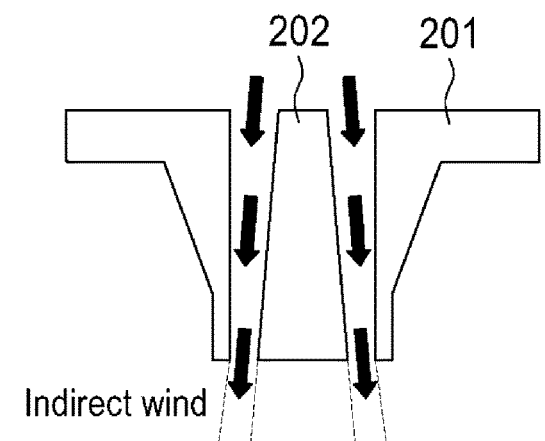
Direct wind
Indirect wind
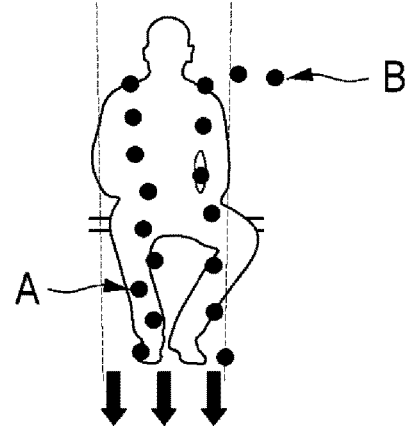
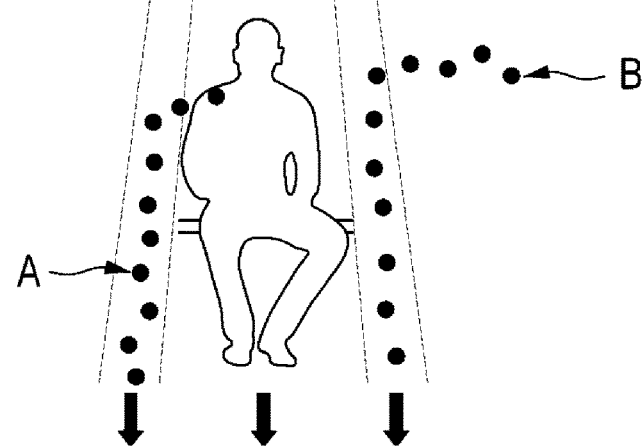
FIG. 3A
FIG. 3B

DROPLET-BLOCKING AIR CONDITIONING SYSTEM INSIDE TRAIN COMPARTMENT

TECHNICAL FIELD

The present invention relates to a droplet-blocking air conditioning system inside a train compartment, and more particularly, to a droplet-blocking air conditioning system inside a train compartment which blocks droplets from spreading inside a train compartment.

BACKGROUND ART

Entering the 2000s, infectious diseases such as SARS, MERS, and coronavirus have become increasingly prevalent, and as infectious diseases that originated in some regions spread globally, not only human casualties but also enormous economic losses are occurring due to infectious diseases.

In particular, in the case of the coronavirus that has recently emerged, it is causing great social chaos, such as the cancellation of all meetings and conferences of various organizations/groups, and classes at schools/academies, due to its strong spread in indoor spaces, and it is recommended to use a mask to prevent respiratory virus infections.

Meanwhile, most people have no choice but to use transportation methods such as airplanes, trains, subways, express buses, and passenger ships for their daily lives. Among these transportation methods, an unspecified number of users may sit in the seats of the trains for a long period of time. Accordingly, dangerous situations may arise, such as multiple users being exposed to respiratory viruses while moving.

As described above, in order to prevent users from being exposed to respiratory viruses in the train compartment, the train compartment is equipped with an air conditioning system to circulate the air in the compartment as illustrated in FIG. 1.

FIG. 1 is a diagram of an air conditioning system for a train compartment of the related art. Referring to FIG. 1, the train 1 may be equipped with compartments 2 and seats 3 for users to sit in the compartments 2 and may be equipped with an air conditioning system unit 4 which circulates the air in the compartments 2.

However, the air conditioning system for train compartments of the related art generates a rotational flow of air within the compartment 2, so that the droplets remaining in the compartments 2 may spread to the entire area within the compartments 2. There is a problem in that as the droplets spread, it takes a long time for the droplets to be discharged to the outside of the compartments 2 along with the air, and as a result, contamination accumulates in the compartments 2 and the user in the compartments 2 is exposed to droplet infection.

CITATION LIST

Patent Document (Patent Document 1) Japanese Patent Registration No. 6228087 (registered on Oct. 20, 2017)
(Patent Document 2) Korean Registered Pat. No. 10-2230159 (registered on Mar. 15, 2021)
(Patent Document 3) Japanese Laid-Open No. 2011-030719 (published on Feb. 17, 2011)
(Patent Document 4) Korean Registered Pat. No. 10-1992650 (registered on Jun. 19, 2019)

DISCLOSURE

Technical Problem

In order to solve the above-described problem, an object of the present invention is to provide a droplet-blocking air conditioning system inside a train compartment which discharges the droplets remaining in the train compartment to the outside of the compartment by downdraft air supplied to the compartment to block the droplet from being spread.

Further, another object of the present invention is to provide a droplet-blocking air conditioning system inside a train compartment which quickly discharges droplets remaining in the compartment to the outside of the compartment by allowing a pressure difference between downdraft air which is supplied to the compartment and downdraft air which is discharged to the outside.

Technical objects to be achieved in the present invention are not limited to the aforementioned technical objects, and another not-mentioned technical object will be clearly understood by those skilled in the art from the description below.

Technical Solution

In order to achieve the above-described objects, a droplet-blocking air conditioning system inside a train compartment according to an exemplary embodiment of the present invention may include an air conditioning system unit for regulating the temperature and humidity of the air inside the train compartment; an air supply regulation unit which uses downdraft air to supply the compartment with the air that has had the temperature and humidity regulated by the air conditioning system unit, thereby causing the droplets remaining in the compartment to flow below the compartment due to the downdraft air; a mechanical motor and an electronic motor which control a degree of rotation of the air adjustment member according to the degree of rotation of a rotary shaft inside the air supply regulation unit; and an air discharge unit for discharging the droplets and the downdraft air to the outside of the compartment.

Further, the air supply regulation unit may include: a main body which has a ventilation hole which is formed therebelow to supply the downdraft air to the compartment; and the air adjustment member which is provided in an inner space of the main body and adjusts the flowing direction of the downdraft air to supply the downdraft air which passes through the ventilation hole to be directly supplied to the seat or supplied to the periphery of the seat.

The air adjustment member is formed to be rotatable in the inner space of the main body to adjust the flowing direction of the downdraft air to the seat or the periphery of the seat by the rotation.

Further, the mechanical motor includes a rotary shaft which passes through the main body to be exposed to the compartment while being connected to the air adjustment member and may control a degree of rotation of the air adjustment member according to a degree of rotation of the rotary shaft.

Further, the electronic motor includes a rotary shaft which is connected to the air adjustment member and may control a degree of rotation of the air adjustment member according to a degree of rotation of the rotary shaft.

Further, the electronic motor is connected to a control module which is provided on the seat or an outer wall of the compartment on a circuit to control a degree of rotation of the rotary shaft according to a control signal input from the control module.

Further, the air discharge unit may include a frame which is fitted into an outlet formed below a seat provided in the compartment and having an open upper side and lower side; a grill which is provided above the frame and includes one or more ventilation holes to allow the droplets and the downdraft air to flow into the inner space of the frame; and a filter which is disposed in an inner space of the frame and collects droplets which pass through the grill to block the droplets from flowing into the compartment.

Further, the droplet-blocking air conditioning system inside a train compartment according to an exemplary embodiment of the present invention may include a suction fan which is disposed below the air discharge unit to suck the downdraft air supplied to the compartment to make a pressure of a downdraft air which passes through the air discharge unit relatively higher than a pressure of a downdraft air supplied from the air supply regulation unit to the compartment.

The suction fan may suck the downdraft air supplied to the compartment to make the pressure of a downdraft air which passes through the air discharge unit 1 to 5% higher than the pressure of the downdraft air supplied to the compartment.

Advantageous Effects

According to the present invention, droplets in the compartment are discharged to protect a user from the droplet infection and a safe seat from the droplet infection may be provided to the user through the downdraft air.

Further, according to the present invention, an air flow direction may be controlled without touching the ventilation hole, which is highly likely to be contaminated, with hands to prevent the virus infection of the user in advance.

Further, according to the present invention, a pressure of the downdraft air which is discharged to the outside of the compartment is increased to easily discharge droplets remaining in the compartment.

Effects to be achieved in the present invention are not limited to the aforementioned effects, and other not-mentioned effects will be obviously understood by those skilled in the art from the description below.

DESCRIPTION OF DRAWINGS

FIGS. 3A to 3B are views for explaining a droplet spreading blocking method of an air supply regulation unit according to an exemplary embodiment of the present invention.

BEST MODE

Figure 1A:
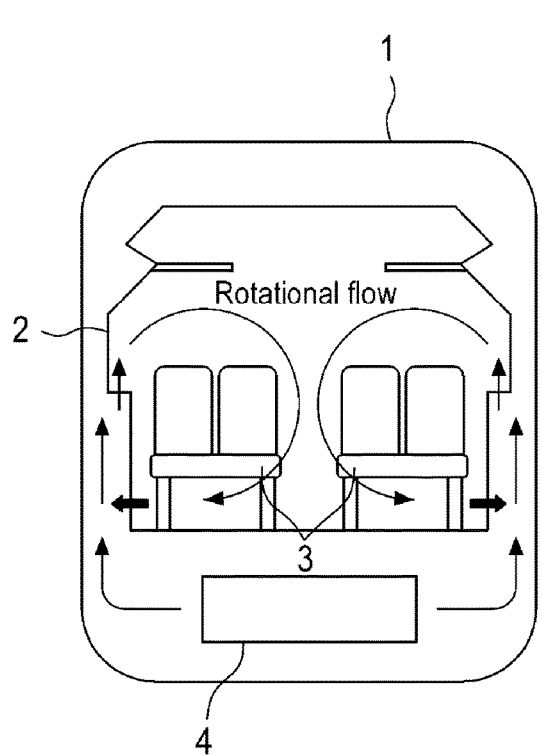
FIGS. 1A to 1B are diagrams of an air conditioning system for a train compartment of the related art.
Figure 1B:
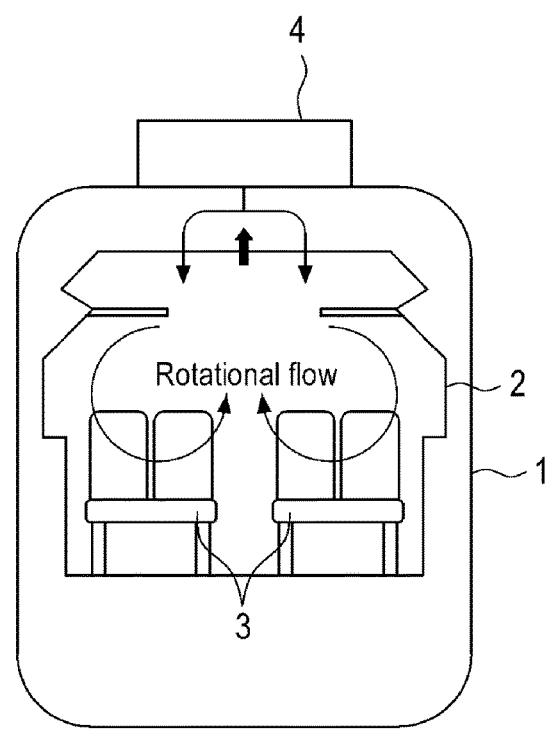

Hereinafter, the present invention will be described in detail with reference to the accompanying drawings, in which exemplary embodiments of the invention are shown to easily perform the present invention by those skilled in the art to which the present invention pertains. However, description of the present invention is just an exemplary embodiment for structural and functional description so that the scope of the present invention is not interpreted to be limited by the exemplary embodiment described in the specification. That is, the exemplary embodiment may be modified in various forms so that it is understood that the scope of the present invention has equivalents which are capable of implementing the technical spirit. Further, it does not mean that the specific exemplary embodiment includes the object or effect proposed in the present invention or includes only the effect so that it is not understood that the scope of the present invention is limited thereby.

In the meantime, meanings of terms described in the present invention should be understood as follows.

The terms "first" or "second" are used to distinguish one component from the other component so that the scope should not be limited by these terms. For example, a first component may be referred to as a second component, and similarly, a second component may be referred to as a first component. It should be understood that, when it is described that an element is "connected" to another element, the element may be directly connected to the other element or connected to the other element through a third element. In contrast, it should be understood that, when it is described that an element is "directly connected" to another element, no element is present between the element and the other element. Other expressions which describe the relationship between components, that is, "between" and "directly between", or "adjacent to" and "directly adjacent to" need to be interpreted in the same manner.

Unless the context apparently indicates otherwise, it should be understood that terms "include" or "have" indicate that a feature, a number, a step, an operation, a component, a part or the combination thereof described in the specification is present, but do not exclude a possibility of presence or addition of one or more other features, numbers, steps, operations, components, parts or combinations thereof, in advance.

Unless they are contrarily defined, all terms used herein have the same meaning as those generally understood by a person with ordinary skill in the art to which the present invention pertains. Terms which are defined in a generally used dictionary should be interpreted to have the same meaning as the meaning in the context of the related art but are not interpreted as an ideally or excessively formal meaning if it is not clearly defined in the present invention.

FIG. 2 is a diagram of a droplet-blocking air conditioning system inside a train compartment according to an exemplary embodiment of the present invention.

Referring to FIG. 2, the droplet-blocking air conditioning system inside a train compartment according to an exemplary embodiment of the present invention includes an air conditioning system unit 100, an air supply regulation unit 200, and an air discharge unit 300.

The air conditioning system unit 100 is disposed in the train 10 and is equipped with an air conditioning device to regulate a temperature and a humidity of the air in the compartment 11 of the train 10 and discharge droplets A and B remaining in the compartment 11 to the outside of the compartment 11.

At this time, the air conditioning device of the air conditioning system unit 100 may include an air conditioning unit (AHU) configured by a heating coil, a cooling coil, a humidifier, an air filter, and the like, heat transport equipment for air circulation or introduction of outside air, automatic control equipment which controls the overall operation of the air conditioning system unit 100 to maintain and operate the air in the compartment 11 in a comfortable state, and a heat pump air conditioner, which is an electrically driven heat pump air conditioner.

The air conditioning device of the air conditioning system unit 100 is a normal device which is used in the air conditioning field so that descriptions of the air conditioning devices will be omitted for the sake of convenience.

The air supply regulation unit 200 supplies air which is supplied from the air conditioning system unit 100 and has regulated temperature and humidity to the compartment 11 as a downdraft air 210 to flow the droplets A and B inside the compartment 11 below the compartment 11 by the downdraft air 210.

At this time, the air supply regulation unit 200 is connected to the air conditioning system unit 100 through a duct 13 equipped in the train 10 to be supplied with air with regulated temperature and humidity from the air conditioning system unit 100.

The air supply regulation unit 200 supplies the downdraft air 210 to the compartment 11 by the following method.

Figure 2A:
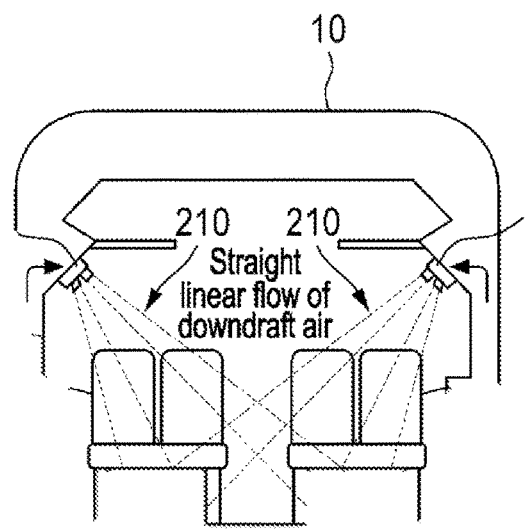
FIGS. 2A to 2B are diagrams of a droplet-blocking air conditioning system inside a train compartment according to an exemplary embodiment of the present invention.

Referring to FIG. 2A, the air supply regulation unit 200 is disposed in an upper side of the compartment 11 and diagonally supplies the downdraft air 210 to the seat 12 to cause the air 210 which is the downdraft air to be discharged below the compartment 11 along with the droplets A and B remaining in the compartment 11.

At this time, some of the droplets A and B remaining in the compartment 11 flow to the air discharge unit 300 which is disposed below the seat 12 along the diagonal downdraft air 210 to be discharged to the outside of the compartment 11, but the other droplets flow to the air discharge unit 300 which is disposed below the other seat 12 adjacent to the seat 12 along the diagonal downdraft air 210 to be discharged to the outside of the compartment 11.

Figure 2B:
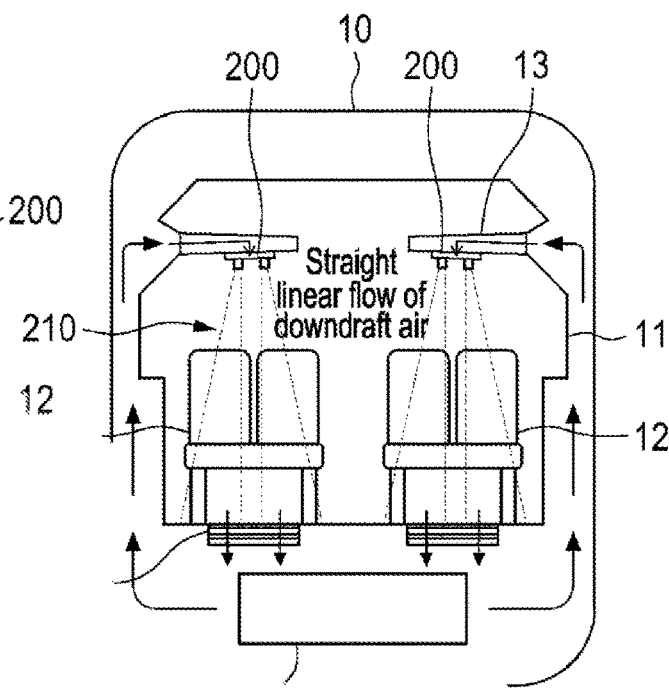

In contrast, referring to FIG. 2B, the air supply regulation unit 200 is disposed in an upper side of the compartment 11 and straightly (or vertically) supplies the downdraft air 210 to the seat 12 to cause the downdraft air 210 in the straight direction to be discharged to the lower side of the compartment 11 together with the droplets A and B remaining in the compartment 11.

At this time, the droplets A and B remaining in the compartment 11 flow to the air discharge unit 300 disposed below the seat 12 along the downdraft air 210 in the straight direction to be discharged to the outside of the compartment 11.

In the present invention, a droplet spreading blocking method and components of the air supply regulation unit 200 will be described in more detail with respect to the air supply regulation unit 200 illustrated in FIG. 2B which supplies the downstream air 210 in the straight direction to the compartment 11.

FIG. 3 is a view for explaining a droplet spreading blocking method of an air supply regulation unit according to an exemplary embodiment of the present invention.

Referring to FIG. 3, the air supply regulation unit 200 includes a main body 201 and an air adjustment member 202.

The main body 201 receives air with regulated temperature and humidity from the air conditioning system unit 100 and a ventilation hole is located below to supply the air to the compartment 11 as the downdraft air 210.

The air adjustment member 202 is equipped in an inner space of the main body 201 and adjusts a flowing direction of the downdraft air 210 discharged from the ventilation hole to be directly supplied to the seat 12 as illustrated in FIG. 3A or supplied to the periphery of the seat 12 as illustrated in FIG. 3B.

At this time, the downdraft air 210 which is directly supplied to the seat 12 is directed to the seat 12 and thus flows the ejected droplets A ejected from the mouth and the nose of a user who is seated in the seat 12 to the air discharge unit 300 to prevent the ejected droplets A from being spread in the compartment 11 and flows the external droplet B which is ejected from a mouth and a nose of the other user to the air discharge unit 300 before being sucked to the mouth and the nose of the user to protect the user from the droplet infection.

In contrast, the downdraft air 210 supplied to the periphery of the seat 12 is divided by the air adjustment member 202 and discharged from the ventilation hole of the main body 201 as the air 210*a* and 210*b*. Since a downward air area of the airs 210*a* and 210*b* is directed toward the periphery of the seat 12, the ejected droplet A flows to the air discharge unit 300 to prevent the ejected droplet A from being spread in the compartment 11 so that the external droplet B flows to the air discharge unit 300 before sucking the external droplet B to the mouth and the nose of the user to protect the user from the droplet inspection.

That is, the downdraft air 210 which is directly supplied to the seat 12 or to the periphery of the seat 12 serves as an air curtain which blocks the ejected droplets A and the external droplets B remaining the compartment 11 from being sucked to the mouth and the nose of the user who sits in the compartment 11.

In the meantime, the air adjustment member 202 is rotatably configured in the inner space of the main body 201 so that when the air adjustment member rotates by the user who sits in the seat 12, the air adjustment member adjusts the flowing direction of the downdraft air 210 and the air adjustment member 200 adjusts a flowing direction of the downdraft air 210 by the following method.

FIG. 4 is a diagram of an air supply regulation member according to an exemplary embodiment of the present invention equipped with a mechanical motor.

Referring to FIG. 4, the air supply regulation unit 200 includes a mechanical motor 203 to mechanically rotate the air adjustment member 202.

The mechanical motor 203 includes a rotary shaft which passes through the main body 201 to be exposed to the compartment 11 to be rotated by a user while being connected to the air adjustment member 202 and the degree of rotation of the air adjustment member 202 is controlled according to the degree of rotation of the rotary shaft.

Figure 4A:
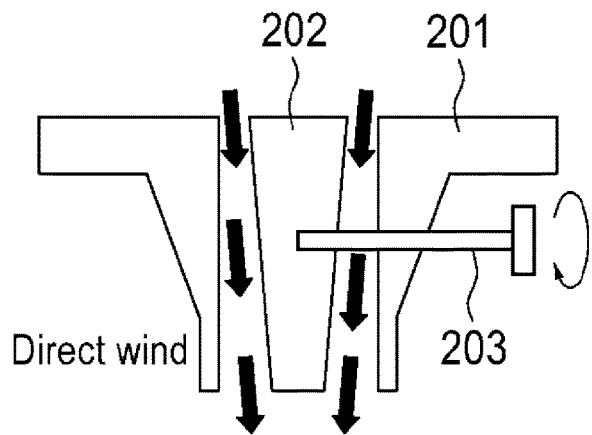
FIGS. 4A to 4B are diagrams of an air supply regulation member according to an exemplary embodiment of the present invention equipped with a mechanical motor.
Figure 4B:
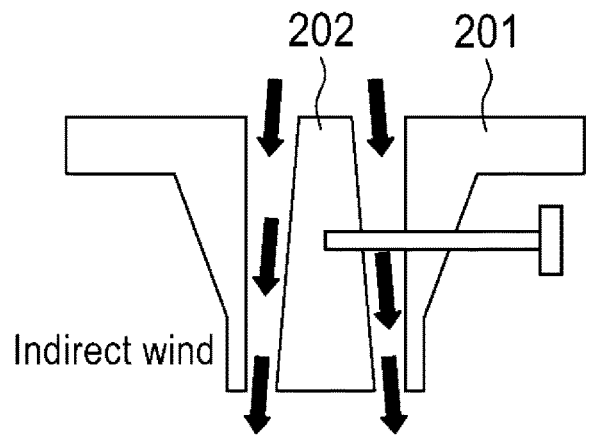

That is, the air supply regulation unit 200 includes the mechanical motor 203 to allow the air adjustment member 202 to be rotated by means of a mechanical rotary shaft and rotates the air adjustment member 202 according to the degree of rotation of the rotary shaft equipped in the mechanical motor 203 to allow the downdraft air 210 to be directly supplied to the seat 12 as illustrated in FIG. 4Aa) or allow the downdraft air 210 to be supplied to the periphery of the seat 12 as illustrated in FIG. 4B.

The air supply regulation unit 200 may rotate the air adjustment member 202 not only by the mechanical manner, but also by an electronic manner using an electronic circuit, and the electronic rotation method of the air adjustment member 202 is as follows.

FIG. 5 is a diagram of an air supply regulation member according to an exemplary embodiment of the present invention equipped with an electronic motor.

Referring to FIG. 5, the air supply regulation unit 200 includes the electronic motor 204 which electronically rotates the air adjustment member 202.

The electronic motor 204 includes a rotary shaft which is rotated by a user while being connected to the air adjustment member 202 and the degree of rotation of the air adjustment member 202 is controlled according to the degree of rotation of the rotary shaft.

In the present invention, the electronic motor 204 is connected to a control module equipped on an arm holder of the seat 12 or an outer wall of the compartment 11 on a circuit to control the degree of the rotation of the rotary shaft according to a control signal input through the control module by the user.

When the control module is provided in the seat 12, the control modules are desirably provided in all the seats 12 disposed in the compartment 11 and when the control module is provided on the outer wall of the compartment 11, the control module is desirably provided on an outer wall which partitions windows of the train 10.

Figure 5A:
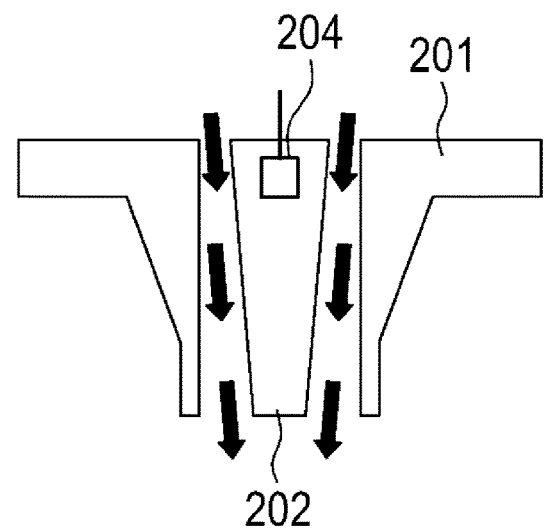
FIGS. 5A to 5B are diagrams of an air supply regulation member according to an exemplary embodiment of the present invention equipped with an electronic motor.
Figure 5B:
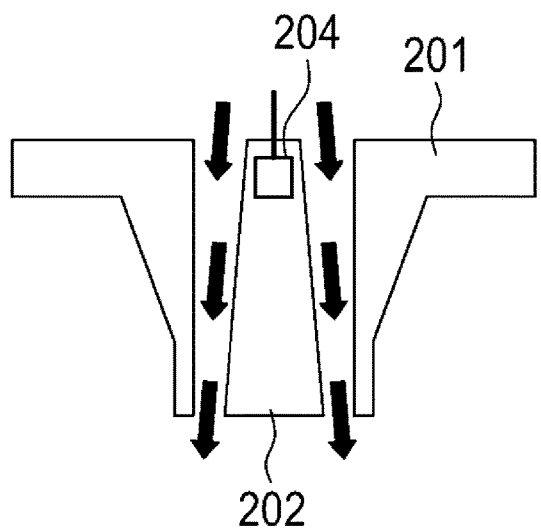

That is, the air supply regulation unit 200 includes the electronic motor 204 to allow the air adjustment member 202 to be rotated by means of an electronic rotary shaft according to the control signal of the control module and rotates the air adjustment member 202 according to the degree of rotation of the rotary shaft equipped in the electronic motor 204 to allow the downdraft air 210 to be directly supplied to the seat 12 as illustrated in FIG. 5A or allow the downdraft air 210 to be supplied to the periphery of the seat 12 as illustrated in FIG. 5B.

Such an air supply regulation unit 200 regulates the flowing direction of the downdraft air 210 without causing a user to touch a ventilation hole which is highly likely to be contaminated according to the consistent discharging of the downdraft air 210 by rotating the air adjustment member 202 so that the virus infection of the user may be prevented in advance.

Since the downdraft air 210 flows the ejected droplet A and the external droplet B below the seat 12, the air discharge unit 300 is desirably disposed below the seat 12 to discharge the droplets A and B to the outside of the compartment 11.

The structure of the air discharge unit 300 for discharging the downdraft air 210 which flows below the seat 12 and the droplets A and B to the outside of the compartment 11 is as follows.

Figure 6:
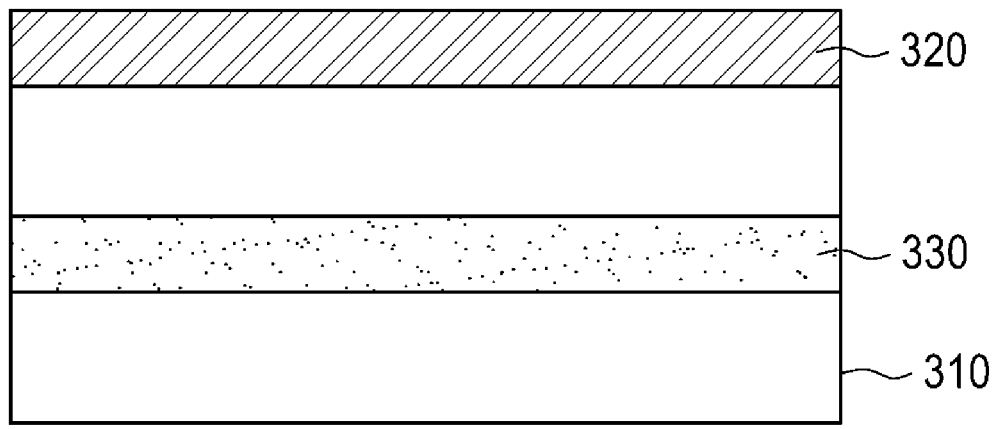
FIG. 6 is a cross-sectional view of an air discharge unit according to an exemplary embodiment of the present invention.

FIG. 6 is a cross-sectional view of an air discharge unit according to an exemplary embodiment of the present invention.

Referring to FIG. 6, the air discharge unit 300 includes a frame 310, a grill 320, and a filter 330.

The frame 310 is fitted into an outlet formed on the lower side of the seat 12 to discharge the downdraft air 210 and the droplets A and B to the outside of the compartment 11 and an upper side and a lower side thereof are open to allow the downdraft air 210 and the droplets A and B to flow to the outside of the compartment 11.

The grill 320 is provided above the frame 310 and has one or more ventilation holes to flow the downdraft air including the droplets A and B into the inner space of the frame 310.

The filter 330 is disposed below the grill 320 on the inner space of the frame 310 and collects the droplets A and B included in the downdraft air 210 which passes through the ventilation holes of the grill 320 to block the droplets A and B from entering the compartment 11.

The filter 330 may desirably be a filter for blocking droplets, such as an electrostatic filter which is capable of collecting the droplets A and B.

The grill 320 and the filter 330 may be detachable from the frame 310 to be replaced according to the contamination degree due to the droplets A and B.

In the present invention, the droplet-blocking air conditioning system inside a compartment may further include a suction fan 400 which sucks the downdraft air 210 including droplets A and B to easily perform the process of discharging the droplets A and B which flow along with the downdraft air 210 to the outside of the compartment 11.

Figure 7:
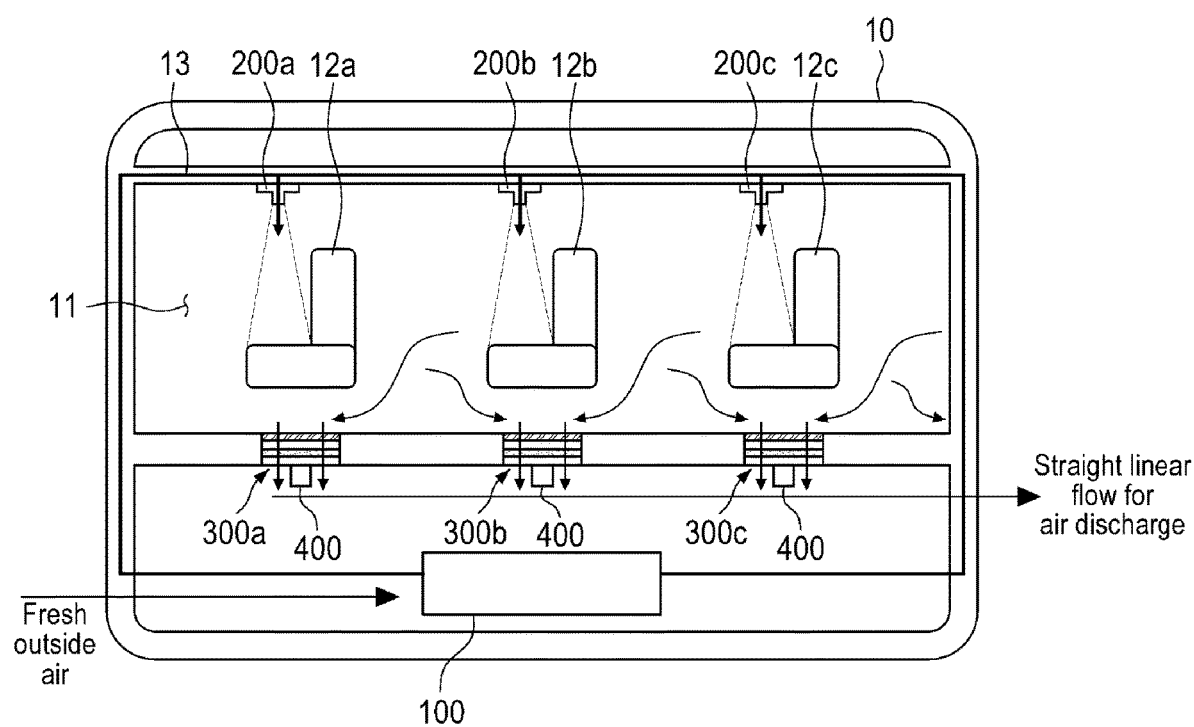
FIG. 7 is a diagram of an air conditioning process of a droplet-blocking air conditioning system inside a train compartment according to an exemplary embodiment of the present invention.

FIG. 7 is a diagram of an air conditioning process of a droplet-blocking air conditioning system inside a train compartment according to an exemplary embodiment of the present invention.

Referring to FIG. 7, the suction fan 400 is disposed below the air discharge unit 300 and sucks the downdraft air 210 which is supplied to the compartment 11 to make a pressure of the downdraft air 210 including the droplets A and B which passes through the air discharge unit 300 higher than a pressure of the downdraft air 210 which is supplied from the air supply regulation unit 200 to the compartment 11.

In the present invention, the suction fan 400 is controlled its rotation by a control device in the train 10 to suck the downdraft air 210 supplied in the compartment 11 to make the pressure of the downdraft air 210 including the droplets A and B1 to 5% higher than a pressure of the downdraft air 210 which is supplied from the air supply regulation unit 200 to the compartment 11.

In the droplet-blocking air conditioning system in the compartment illustrated in FIG. 7, a plurality of seats 12*a*, 12*b*, and 12*c* may be provided to allow a plurality of users to be seated and a plurality of air supply regulation units 200*a*, 200*b*, and 200*c* may be disposed on a top of the compartment 11 to supply the downdraft air 210 to the plurality of seats 12*a*, 12*b*, and 12*c*, respectively, and a plurality of air discharge units 300*a*, 300*b*, and 300*c* may be provided to discharge the downdraft air 210 discharged from the air supply regulation units 200*a*, 200*b*, and 200*c*, respectively, below the seats 12*a*, 12*c*, and 12*c* so that a plurality of suction fans 400 is also desirably provided.

The air conditioning process of the droplet-blocking air conditioning system in the compartment which blocks the spread of the droplets A and B in the compartment 11 is configured as follows.

First, fresh (clean) air in the outside of the train 10 is supplied to the air conditioning system unit 100 and the air conditioning system unit 100 regulates the temperature and the humidity of the fresh air to generate air with adjusted temperature and humidity.

Next, the air conditioning system unit 100 may supply the air with the regulated temperature and humidity to the air supply regulation unit 200 through the duct 13.

Thereafter, the air supply regulation unit 200 discharges the air with the regulated temperature and humidity supplied from the air conditioning system unit 100 to the compartment 11 as the downdraft air 210 to supply the air directly to the seat 12 or the periphery of the seat 12.

Thereafter, the downdraft air 210 allows the ejected droplet A and the external droplet B remaining in the compartment 11 to flow to the air discharge unit 300 disposed below the seat 12.

Thereafter, the suction fan 400 sucks the air and the droplets A and B flowing to the air discharge unit 300 so that the droplets A and B may be collected by the filter 330 of the air discharge unit 300 and the remaining air may flow to the outside of the compartment 11.

Thereafter, the air which passes through the suction fan 400 may be discharged to the outside of the train 10 through a separate duct which is connected to the outside of the train 10.

As described above, the detailed description of the preferred exemplary embodiments of the disclosed present invention is provided such that those skilled in the art implement and carry out the present invention. While the disclosure has been described with reference to the preferred exemplary embodiments, it will be understood by those skilled in the art that various changes and modifications of the present invention may be made without departing from the scope of the invention. For example, those skilled in the art may use configurations disclosed in the above-described exemplary embodiments by combining them with each other. Therefore, the present invention is not intended to be limited to the above-described exemplary embodiments but to assign the widest scope consistent with disclosed principles and novel features.

The present invention may be implemented in another specific form within the scope without departing from the technical spirit and essential feature of the present invention. Therefore, the detailed description should not restrictively be analyzed in all aspects and should be exemplarily considered. The scope of the present invention should be determined by rational interpretation of the appended claims and all changes are included in the scope of the present invention within the equivalent scope of the present invention. The present invention is not intended to be limited to the above-described exemplary embodiments but to assign the widest scope consistent with disclosed principles and novel features. Further, claims having no clear quoting relation in the claims are combined to configure the exemplary embodiment or may be included as new claims by correction after application.

The invention claimed is:

1. A droplet-blocking air conditioning system inside a train compartment, comprising:
   an air conditioning system unit for regulating a temperature and a humidity of air inside the compartment;
   an air supply regulation unit which uses downdraft air to supply the compartment with the air that has had the temperature and humidity regulated by the air conditioning system unit, thereby causing droplets remaining in the compartment to flow below the compartment due to the downdraft air;
   an electronic motor which controls a degree of rotation of an air adjustment member according to a degree of rotation of a rotary shaft inside the air supply regulation unit; and
   an air discharge unit for discharging the droplets and the downdraft air to an outside of the compartment,
   wherein the air discharge unit includes:
   a frame which is fitted into an outlet formed below a seat provided in the compartment and having an open upper side and lower side;
   a grill which is provided above the frame and includes one or more ventilation holes to allow the droplets and the downdraft air to flow into an inner space of the frame; and
   a filter which is disposed in the inner space of the frame and collects the droplets which pass through the grill to block the droplets from flowing into the compartment,
   wherein the air supply regulation unit includes:
   a main body which has a ventilation hole which is formed therebelow to supply the downdraft air to the compartment; and
   the air adjustment member which is provided in an inner space of the main body and adjusts a flowing direction of the downdraft air to supply the downdraft air which passes through the ventilation hole directly to the seat or to form an air curtain surrounding a periphery of the seat.

2. The droplet-blocking air conditioning system inside a train compartment of claim 1, wherein the air adjustment member is formed to be rotatable in the inner space of the main body to adjust the flowing direction of the downdraft air to the seat or the periphery of the seat by rotation.

3. The droplet-blocking air conditioning system inside a train compartment of claim 2, wherein the electronic motor includes a rotary shaft which is connected to the air adjustment member and controls the degree of rotation of the air adjustment member according to the degree of rotation of the rotary shaft.

4. The droplet-blocking air conditioning system inside a train compartment of claim 3, wherein the electronic motor is connected to a control module which is provided on the seat or an outer wall of the compartment on a circuit to control the degree of rotation of the rotary shaft according to a control signal input from the control module.

5. The droplet-blocking air conditioning system inside a train compartment of claim 1, comprising:
   a suction fan which is disposed below the air discharge unit to suck the downdraft air supplied to the compartment to make a pressure of a downdraft air which passes through the air discharge unit higher than a pressure of a downdraft air supplied from the air supply regulation unit to the compartment.

6. The droplet-blocking air conditioning system inside a train compartment of claim 5, wherein the suction fan sucks the downdraft air supplied to the compartment to make the pressure of the downdraft air which passes through the air discharge unit 1 to 5% higher than the pressure of the downdraft air supplied to the compartment.

* * * * *